Sept. 9, 1969          P. L. RUBEN          3,466,115

FOUR COMPONENT WIDE APERTURE LENS

Filed July 1, 1966

| F = 100 | | | | $f/1.2$ |
|---|---|---|---|---|
| ELEMENT | N | V | R | T & S |
| 1 | $N_1 = 1.753$ | $V_1 = 50.6$ | $R_1 = +131.52$ | $S_1 = 14.29$ |
|   |   |   | $R_2 = -737.93$ | $T_1 = 16.43$ |
| 2 | $N_2 = 1.720$ | $V_2 = 29.3$ | $R_3 = -96.043$ | $S_2 = 20.71$ |
|   |   |   | $R_4 = +94.329$ | $T_2 = 60.00$ |
| 3 | $N_3 = 1.753$ | $V_3 = 50.6$ | $R_5 = +116.97$ | $S_3 = 2.02$ |
|   |   |   | $R_6 = -96.043$ | $T_3 = 24.29$ |
| 4 | $N_4 = 1.6968$ | $V_4 = 56.2$ | $R_7 = +86.129$ | $S_4 = 1.43$ |
|   |   |   | $R_8 = +154.39$ | $T_4 = 34.29$ |

PAUL L. RUBEN
INVENTOR.

BY *Leonard W. Treash*
*Robert W. Hampton*
ATTORNEYS

United States Patent Office 3,466,115
Patented Sept. 9, 1969

3,466,115
FOUR COMPONENT WIDE APERTURE LENS
Paul L. Ruben, Penfield, N.Y., assignor to Eastman Kodak Company, Rochester, N.Y., a corporation of New Jersey
Filed July 1, 1966, Ser. No. 562,207
Int. Cl. G02b 9/34
U.S. Cl. 350—220          4 Claims

ABSTRACT OF THE DISCLOSURE

Wide aperture lenses consisting of four simple airspaced components comprising from front to rear a biconvex positive component, a thick biconcave negative component, a biconvex positive component and a meniscus positive component concave to the rear.

---

This invention relates to wide aperture lenses. More specifically, this invention relates to a four-component lens correctable to apertures as wide as $f/1.2$.

In a co-filed application, U.S. Serial No. 562,206, filed in the name of Mr. W. H. Price, and entitled "Wide Aperture Lens," it was found that apertures as wide as $f/1.0$ could be obtained using several inventive features in combination. In one of these features a triplet was modified by splitting the positive rear power into two positive components. These two positive rear components were so arranged that the airspace between them had two strongly converging surfaces complying with the following inequalities:

$$1 < \frac{L}{R_7} < 1 + N_4$$

$$R_8 > 0$$

$$0.7 < \frac{f_6}{f_7} < 1.2$$

$$0.8F < f_6, f_7 < 1.3F$$

the terms being defined below.

This configuration of the rear two components was combined with the feature of splitting the negative power into two components, a moderately thick bi-concave negative component and a thin negative meniscus component concave to the front positioned immediately in front of the bi-concave component. When these two features were combined along with a thick front positive component and high index glasses, excellent corrections were obtained at an aperture of $f/1.0$.

It is an object of this invention to provide four-component objectives corrected to apertures from $f/1.2$ to $f/1.6$.

I have found that this object can be accomplished by replacing the front three components of the lenses in the Price application with a relatively thin positive component and a very thick negative bi-concave component. More specifically, in a lens having the rear configuration of the Price lenses there is substituted for the front three components a positive lens having a thickness of less than $.20F$ and a negative lens having a thickness greater than $.25F$. Although the resulting lens must be stopped down to between $f/1.2$ and $f/1.6$, the corrections there obtained are remarkable for a four-component lens.

Figures 1, 2:
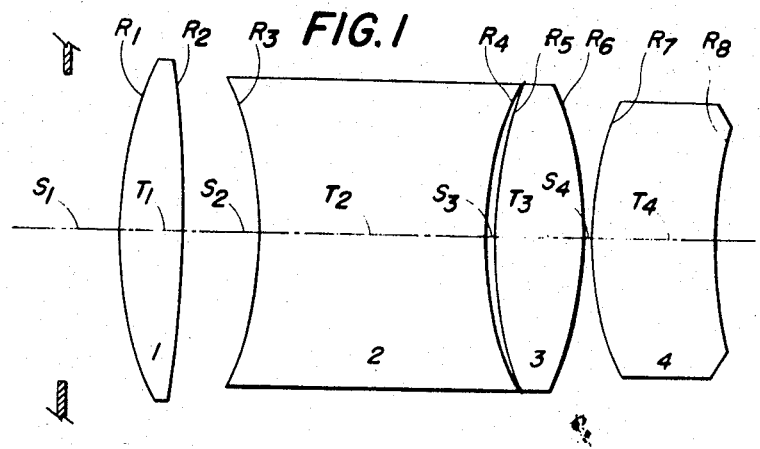
FIG. 1 is a diagrammatic axial cross section of a lens constructed according to the invention.
FIG. 2 is a chart showing the specifications for construction of a lens according to FIG. 1.

For describing and claiming the invention the lens elements are numbered from front to rear. F is the focal length of the lens. The indexes of refraction N for the D line of the spectrum, the dispersive indexes V, the radii of curvature R, the thickness T and the separations S are numbered by subscripts from front to rear. The long conjugate side of the lens is considered the front. Radii of curvature having centers of curvature to the rear of the surface are considered positive; to the front are considered negative. $f_6$ and $f_7$ are the focal lengths of the front and rear surfaces respectively of the airspace between the two rear components. The terms lens and objective shall be used to describe the complete lens and not elements or components thereof.

L is the object distance of the rays from an axial original object as those rays strike the front surface ($R_7$) of the rear component. By the term "object distance" is meant the distance measured along the axis from the surface ($R_7$) to the point or points where the rays would strike the axis if extended (not deflected by surfaces $R_7$ and $R_8$). By the term "axial original object" is meant the axial object for the complete lens. In the case of a motion picture camera lens this is generally considered to be at infinity and on the axis.

FIGS. 1 and 2 show a well-corrected lens capable of sharp definition at $f/1.2$ over a field of 14° half-angle. Example 1 is a specification for construction of the lens shown in FIGS. 1 and 2.

EXAMPLE 1 (FIGS. 1 AND 2)

$F=100$  $f/1.2$

| Element | N | V | R | S or T |
|---|---|---|---|---|
| 1 | $N_1=1.753$ | $V_1=50.6$ | $R_1=+131.52$ | $S_1=14.29$ |
|   |   |   | $R_2=-737.93$ | $T_1=16.43$ |
|   |   |   |   | $S_2=20.71$ |
| 2 | $N_2=1.720$ | $V_2=29.3$ | $R_3=-96.043$ | $T_2=60.00$ |
|   |   |   | $R_4=+94.329$ |   |
|   |   |   |   | $S_3=2.02$ |
| 3 | $N_3=1.753$ | $V_3=50.6$ | $R_5=+116.97$ | $T_3=24.29$ |
|   |   |   | $R_6=-96.043$ |   |
|   |   |   |   | $S_4=1.43$ |
| 4 | $N_4=1.6968$ | $V_4=56.2$ | $R_7=+86.129$ | $T_4=34.29$ |
|   |   |   | $R_8=+154.39$ |   |

Examples 2 and 3 show lenses which have been closed slightly from Example 1 for an aperture of $f/1.4$. They are slightly better corrected than Example 1 and are somewhat less expensive because the thickness $T_2$ of the negative component has been substantially reduced.

EXAMPLE 2

F=100     f/1.4

| Element | N | V | R | S or T |
|---|---|---|---|---|
| 1 | $N_1=1.753$ | $V_1=50.6$ | $R_1=+93.850$ | $S_1=14.29$ |
|   |             |             | $R_2=-718.86$ | $T_1=16.07$ |
|   |             |             |               | $S_2=27.14$ |
|   |             |             | $R_3=-79.964$ |             |
| 2 | $N_2=1.720$ | $V_2=29.3$ |               | $T_2=29.64$ |
|   |             |             | $R_4=+74.350$ |             |
|   |             |             |               | $S_3=3.21$  |
|   |             |             | $R_5=+98.700$ |             |
| 3 | $N_3=1.753$ | $V_3=50.6$ |               | $T_3=20.00$ |
|   |             |             | $R_6=-77.486$ |             |
|   |             |             |               | $S_4=1.43$  |
|   |             |             | $R_7=+89.207$ |             |
| 4 | $N_4=1.6968$| $V_4=56.2$ |               | $T_4=29.29$ |
|   |             |             | $R_8=+160.51$ |             |

EXAMPLE 3

F=100     f/1.4

| Element | N | V | R | S or T |
|---|---|---|---|---|
| 1 | $N_1=1.753$ | $V_1=50.6$ | $R_1=+110.65$ | $S_1=14.29$ |
|   |             |             | $R_2=-2000.3$ | $T_1=14.64$ |
|   |             |             |               | $S_2=22.86$ |
|   |             |             | $R_3=-77.093$ |             |
| 2 | $N_2=1.720$ | $V_2=29.3$ |               | $T_2=38.21$ |
|   |             |             | $R_4=+95.893$ |             |
|   |             |             |               | $S_3=2.57$  |
|   |             |             | $R_5=+151.11$ |             |
| 3 | $N_3=1.753$ | $V_3=50.6$ |               | $T_3=20.71$ |
|   |             |             | $R_6=-74.050$ |             |
|   |             |             |               | $S_4=1.43$  |
|   |             |             | $R_7=+81.829$ |             |
| 4 | $N_4=1.6968$| $V_4=56.2$ |               | $T_4=35.00$ |
|   |             |             | $R_8=+115.92$ |             |

In Example 4 the aperture is further closed down to f/1.6. This enables still excellent corrections with the substitution of very inexpensive glasses. Note that at this aperture it is no longer necessary for $T_2$ to be extremely large.

EXAMPLE 4

F=100     f/1.6

| Element | N | V | R | S or T |
|---|---|---|---|---|
| 1 | $N_1=1.617$ | $V_1=54.9$ | $R_1=+84.843$ | $S_1=14.29$ |
|   |             |             | $R_2=-310.43$ | $T_1=16.14$ |
|   |             |             |               | $S_2=20.93$ |
|   |             |             | $R_3=-58.733$ |             |
| 2 | $N_2=1.689$ | $V_2=30.9$ |               | $T_2=26.36$ |
|   |             |             | $R_4=+90.279$ |             |
|   |             |             |               | $S_3=3.93$  |
|   |             |             | $R_5=+502.27$ |             |
| 3 | $N_3=1.617$ | $V_3=54.9$ |               | $T_3=18.00$ |
|   |             |             | $R_6=-50.200$ |             |
|   |             |             |               | $S_4=1.43$  |
|   |             |             | $R_7=+69.464$ |             |
| 4 | $N_4=1.617$ | $V_4=54.9$ |               | $T_4=32.57$ |
|   |             |             | $R_8=+126.44$ |             |

All of the above examples are well-corrected for a field of at least 14° half-angle.

For purposes of clearly defining the invention the following inequalities are applicable:

$$T_1 < .20F$$
$$T_1 > .25F$$

As evidenced by Examples 1 through 3, these inequalities work best in the following environment:

$$N_1, N_3 > 1.73$$
$$N_2 > 1.70$$
$$N_4 > 1.67$$
$$48 < V_1 < 53$$
$$48 < V_3 < 53$$
$$54 < V_4 < 59$$
$$27 < V_2 < 32$$

The best results in obtaining a wide aperture in a four-component objective with acceptable corrections were produced when $T_2$ was made greater than .50F as in Example 1.

Although the invention has been described in considerable detail with reference to certain preferred embodiments thereof, it will be understood that variations and modifications can be effected without departing from the spirit and scope of the invention as described hereinabove.

I claim:

1. A lens consisting of four simple airspaced components comprising from front to rear a biconvex positive component, a biconcave negative component and two positive components, said lens being constructed substantially according to the specifications of the following chart wherein the indexes of refraction N for the D line of the spectrum, dispersive index V, the radii of curvature R, the thicknesses T and the separations S are numbered from front to rear by subscripts and F is the focal length of the lens:

F=100     f/1.2

| Element | N | V | R | S or T |
|---|---|---|---|---|
| 1 | $N_1=1.753$ | $V_1=50.6$ | $R_1=+131.52$ | $S_1=14.29$ |
|   |             |             | $R_2=-737.93$ | $T_1=16.43$ |
|   |             |             |               | $S_2=20.71$ |
|   |             |             | $R_3=-96.043$ |             |
| 2 | $N_2=1.720$ | $V_2=29.3$ |               | $T_2=60.00$ |
|   |             |             | $R_4=+94.329$ |             |
|   |             |             |               | $S_3=2.02$  |
|   |             |             | $R_5=+116.97$ |             |
| 3 | $N_3=1.753$ | $V_3=50.6$ |               | $T_3=24.29$ |
|   |             |             | $R_6=-96.043$ |             |
|   |             |             |               | $S_4=1.43$  |
|   |             |             | $R_7=+86.129$ |             |
| 4 | $N_4=1.6968$| $V_4=56.2$ |               | $T_4=34.29$ |
|   |             |             | $R_8=+154.39$ |             |

2. A lens consisting of four simple airspaced components comprising from front to rear a biconvex positive component, a biconcave negative component and two positive components, said lens being constructed substantially according to the specifications of the following chart wherein the indexes of refraction N for the D line of the spectrum, dispersive index V, the radii of curvature R, the thicknesses T and the separations S are numbered from front to rear by subscripts and F is the focal length of the lens:

F=100     f/1.4

| Element | N | V | R | S or T |
|---|---|---|---|---|
| 1 | $N_1=1.753$ | $V_1=50.6$ | $R_1=+93.850$ | $S_1=14.29$ |
|   |             |             | $R_2=-718.86$ | $T_1=16.07$ |
|   |             |             |               | $S_2=27.14$ |
|   |             |             | $R_3=-79.964$ |             |
| 2 | $N_2=1.720$ | $V_2=29.3$ |               | $T_2=29.64$ |
|   |             |             | $R_4=+74.350$ |             |
|   |             |             |               | $S_3=3.21$  |
|   |             |             | $R_5=+98.700$ |             |
| 3 | $N_3=1.753$ | $V_3=50.6$ |               | $T_3=20.00$ |
|   |             |             | $R_6=-77.486$ |             |
|   |             |             |               | $S_4=1.43$  |
|   |             |             | $R_7=+89.207$ |             |
| 4 | $N_4=1.6968$| $V_4=56.2$ |               | $T_4=29.29$ |
|   |             |             | $R_8=+160.51$ |             |

3. A lens consisting of four simple airspaced components comprising from front to rear a biconvex positive component, a biconcave negative component and two positive components, said lens being constructed substantially according to the specifications of the following chart wherein the indexes of refraction N for the D line of the spectrum, dispersive index V, the radii of curvature R, the thicknesses T and the separations S are numbered from front to rear by subscripts and F is the focal length of the lens:

F=100    f/1.4

| Element | N | V | R | S or T |
|---|---|---|---|---|
| 1 | $N_1=1.753$ | $V_1=50.6$ | $R_1=+110.65$ | $S_1=14.29$ |
|   |             |             | $R_2=-2000.3$ | $T_1=14.64$ |
|   |             |             |               | $S_2=22.86$ |
| 2 | $N_2=1.720$ | $V_2=29.3$ | $R_3=-77.093$ | $T_2=38.21$ |
|   |             |             | $R_4=+95.893$ | $S_3=2.57$ |
| 3 | $N_3=1.753$ | $V_3=50.6$ | $R_5=+151.11$ | $T_3=20.71$ |
|   |             |             | $R_6=-74.050$ | $S_4=1.43$ |
| 4 | $N_4=1.6968$ | $V_4=56.2$ | $R_7=+81.829$ | $T_4=35.00$ |
|   |             |             | $R_8=+115.92$ |            |

4. A lens consisting of four simple airspaced components comprising from front to rear a biconvex positive component, a biconcave negative component and two positive components, said lens being constructed substantially according to the specifications of the following chart wherein the indexes of refraction N for the D line of the spectrum, dispersive index V, the radii of curvature R, the thicknesses T and the separations S are numbered from front to rear by subscripts and F is the focal length of the lens:

F=100    f/1.6

| Element | N | V | R | S or T |
|---|---|---|---|---|
| 1 | $N_1=1.617$ | $V_1=54.9$ | $R_1=+84.843$ | $S_1=14.29$ |
|   |             |             | $R_2=-310.43$ | $T_1=16.14$ |
|   |             |             |               | $S_2=20.93$ |
| 2 | $N_2=1.689$ | $V_2=30.9$ | $R_3=-58.733$ | $T_2=26.36$ |
|   |             |             | $R_4=+90.279$ | $S_3=3.93$ |
| 3 | $N_3=1.617$ | $V_3=54.9$ | $R_5=+502.27$ | $T_3=18.00$ |
|   |             |             | $R_6=-50.200$ | $S_4=1.43$ |
| 4 | $N_4=1.617$ | $V_4=54.9$ | $R_7=+69.464$ | $T_4=32.57$ |
|   |             |             | $R_8=+126.44$ |            |

References Cited

UNITED STATES PATENTS 2,736,234   2/1956   Schlumpf _____ 350—226
3,020,804   2/1962   Cox et al. _____ 350—220

FOREIGN PATENTS 78,175   11/1949   Czechoslovakia.

DAVID SCHONBERG, Primary Examiner
R. J. STERN, Assistant Examiner

U.S. Cl. X.R.

350—206